United States Patent [19]
LeCompte

[11] Patent Number: 5,143,319
[45] Date of Patent: Sep. 1, 1992

[54] METHOD AND APPARATUS FOR DISPENSING AN OPTICAL FIBER FROM A POWERED MISSILE THROUGH THE MOTOR EXHAUST

[75] Inventor: George W. LeCompte, Tucson, Ariz.

[73] Assignee: Hughes Aircraft Company, Los Angeles, Calif.

[21] Appl. No.: 649,507

[22] Filed: Feb. 1, 1991

[51] Int. Cl.⁵ .............................................. F41G 7/32
[52] U.S. Cl. ................................................. 244/3.12
[58] Field of Search ...................................... 244/3.12

[56]   References Cited
       U.S. PATENT DOCUMENTS

| 3,233,548 | 2/1966 | Chilowsky | 244/3.12 |
| 4,903,607 | 2/1990 | Clark | 244/3.12 |
| 4,974,793 | 12/1990 | Pinson | 244/3.12 |

Primary Examiner—Charles T. Jordan
Attorney, Agent, or Firm—R. M. Heald; C. D. Brown; W. K. Denson-Low

[57]   ABSTRACT

A length of filament (32), wire or optical fiber, is wound into a pack (30) on a cylindrical drum (44) located within an open-ended housing (38). The housing is mounted within a missile (26) with the housing open end (38) facing aft. An undersized front wall (48) fits over the enclosure open end leaving a circular gap or space (50) through which the filament is dispensed. An outer end portion of the filament is reinforced (42) both mechanically and thermally to allow dispensing through outer regions of the missile rocket plume. The walls defining the circular gap (50) brake the filament dispensing to a predetermined maximum speed.

4 Claims, 3 Drawing Sheets

METHOD AND APPARATUS FOR DISPENSING AN OPTICAL FIBER FROM A POWERED MISSILE THROUGH THE MOTOR EXHAUST

BACKGROUND OF THE INVENTION

1. Field of the Invention

The present invention relates generally to dispensing a fiber optic cable from a vehicle where the cable is used as a data link, for example, and, more particularly, to dispensing of such a cable from a rocket-powered or jet-powered missile directly through the motor exhaust.

2. Description of Related Art

In certain kinds of airborne vehicles, such as a missile, for example, a data link is provided interconnecting the missile control apparatus with other apparatus remaining at the launch site. The data link consists of a length of filament, either a wire or preferably an optical fiber, which is wound onto a canister aboard the vehicle and which upon launch is unwound or dispensed to maintain the data link. In the past, a number of techniques have been employed for the dispensing of such filaments with particular care being devoted to avoid the rocket motor plume which could very quickly destroy the filament. In order to prevent dispensing a filament through the motor exhaust, certain missiles have employed rocket motors with the motor thrust exerted along directions off the missile axis, resulting in a reduction in propulsion efficiency. Other apparatus, while operating the missile drive motors more efficiently along the missile axis, has guided or ducted the optical fiber cable along a path outwardly of the motor plume which is complex and expensive to manufacture as well as subject to imposing a frictional load on the fiber that can destroy the cable or reduce signal transmission efficiency.

It is, therefore, desirable to provide apparatus capable of dispensing a fiber through the rocket or jet motor plume which is reliable, relatively simple to manufacture and use, as well as being cost effective.

OBJECTS AND SUMMARY OF THE DISCLOSURE

It is a primary aim and object of the invention to provide an apparatus and method for dispensing an optical fiber cable directly through the motor exhaust of a rocket-powered or jet-powered missile.

Another object is the provision of apparatus and method as in the previous object in which a dispensing brake limits the dispensing velocity to a predetermined range safe for the cable.

The dispenser to be described includes a helically wound fiber pack mounted at the aft end of the missile with its winding axis substantially coaxial with the missile longitudinal axis. The dispenser is fixedly positioned with respect to the missile frame and operates in a non-rotational mode. An initial length of the fiber is encased within a reinforcing and thermally resistant covering forming a "leader". On dispense, the fiber leader passes through a circular slot (pinch brake) having dimensions as to impose a certain amount of drag or friction upon the leader in order to prevent dispensing at a rate exceeding a predetermined safe maximum.

On launch, the leader is dispensed directly through the rocket plume and by virtue of the contact with the plume additional speed of dispensing is produced and, as well, extension of the helical amplitude of the dispensed fiber moves the leader (and fiber that follows) to the outer edge of the plume. In this manner, the leader and fiber is not only aided in its dispensing by contact with the plume, but the plume also moves the leader (and subsequently the fiber) to the plume cooler portions which reduces the heat and also the more turbulent action of the central part of the plume to which the leader is exposed. The pinch brake acts upon the dispensed leader to prevent the dispensing speed from exceeding a predetermined maximum that insures against destruction of the leader or fiber, or bending of the cable to the extent of deteriorating optical signal transmission.

DESCRIPTION OF A PREFERRED EMBODIMENT

Figure 1:
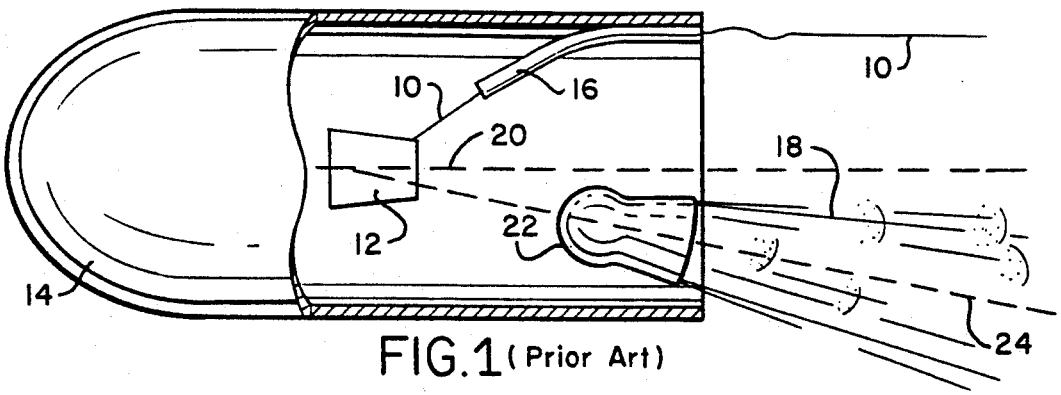
FIG. 1 is a side elevational, partially sectional view of a missile dispensing an optical fiber cable according to a prior art technique.

With reference to the drawing, and particularly FIG. 1, there is shown a prior art method of dispensing an optical fiber cable 10 wound into a pack 12, the latter being mounted on board a missile 14. More particularly, the fiber cable 10 as it is taken off the pack is ducted along a hollow tube 16 in order to be dispensed from the missile aft end at a point spaced laterally from the rocket or jet motor exhaust 18 a substantial distance. By this arrangement the possibility of the motor exhaust 18 damaging the fiber cable is substantially obviated. However, since the dispensing rate is relatively high, the amount of frictional drag imposed by the tube 16 on the cable is not inconsiderable so that this poses some risk of damage to the cable.

FIG. 1 shows the orientation of a rocket motor 22 to direct the motor exhaust along an off-axis direction 24 away from the dispensing cable. This is another approach in the prior art to avoid dispensing a fiber cable through the exhaust plume. However, in this case, there is the undesirable result that motor boost efficiency is impaired.

Figure 2:
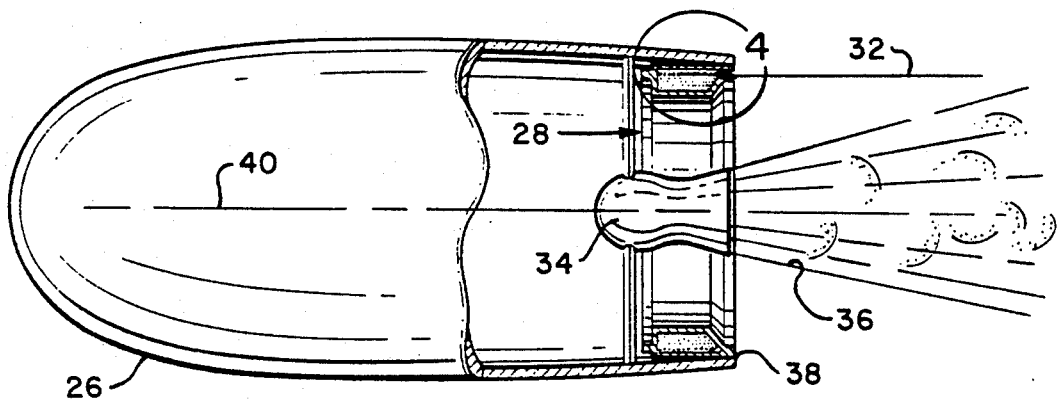
FIG. 2 is a side elevational, sectional view of an airborne vehicle showing a dispenser of the present invention being dispensed according to the method thereof.

For the ensuing description of the invention reference is now made to FIG. 2 of the drawings. A missile 26 shown in sectional view has a dispenser 28 of the present invention including generally a filament pack 30 preferably formed from an optical fiber cable 32 which is wound into a cylindrical coil about an axis arranged generally coaxial to the missile longitudinal axis. The missile also includes a conventional rocket motor 34 mounted internally of the missile aft end (and within the dispenser 28) for projecting a plume 36 along the missile longitudinal axis and outwardly of the missile open end 38 on launch. As will be more particularly described, the fiber 32 will be dispensed in an open helix through the outer edge portions of the plume and directly out the missile open end 38. This is a highly advantageous aspect of the present invention in that there is no need for ducting means or directing the rocket motor exhaust at an inefficient angle, both of which are undesirable.

Figure 3:
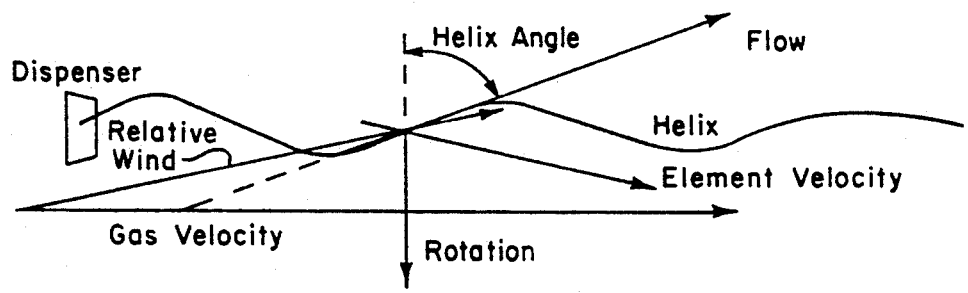
FIG. 3 is a schematic view of a fiber being dispensed into a rocket plume.

FIG. 3 schematically depicts the dispensing of a fiber cable from a fixed dispenser mounted on a moving vehicle, such as the missile 26. The fiber cable forms into a generally helical shape as it leaves the pack 30 rotating to follow the "peel point" from the pack, which peel point must move at a speed equal to the payout rate. That is, the cable in a sense flows along this helical path at a speed equal to the payout rate. More particularly, it can be shown that the instantaneous velocity of a fiber element is the vector sum of the helix rotational velocity and the flow velocity.

From a moving vehicle (e.g., missile 26), there is a flow of air in the direction of the fiber payout which is identified as the gas velocity vector. The difference between the gas velocity and element velocity is essentially the relative wind vector acting on the cable. A large gas velocity (depicted in FIG. 3) acts to increase both the payout speed and the fiber rotation speed, the latter resulting in the expansion of the helix due to the centrifugal force acting upon the fiber. This, in turn, leads to a decrease in the helix angle producing a higher angle of attack between the relative wind vector and the fiber cable element. It is seen, therefore, that an unstable, or regenerative, condition is produced unless the payout speed increases or, alternatively, the gas speed decreases. In the event of the latter, the dashed line indicates the relative wind for the critical gas speed above which the helix is caused to expand and accelerate. For a lower gas speed, the aerodynamic drag damps out the rotation of motion which allows the helix to decay. Because the helix angle decreases as the helix expands, the critical gas velocity decreases with an increase in the helix radius.

Rocket motor exhaust plumes have a very high speed gas flow along the central axis 40 with gas speed decaying rapidly on moving radially outwardly into the surrounding boundary regions until it reaches what is termed free-stream speed which is the air speed of the vehicle. It is clear from this that a stable fiber helix size may exist at that radius measured from the axis of the motor exhaust plume, where plume velocity equals the critical gas velocity for the helix.

Figure 5:
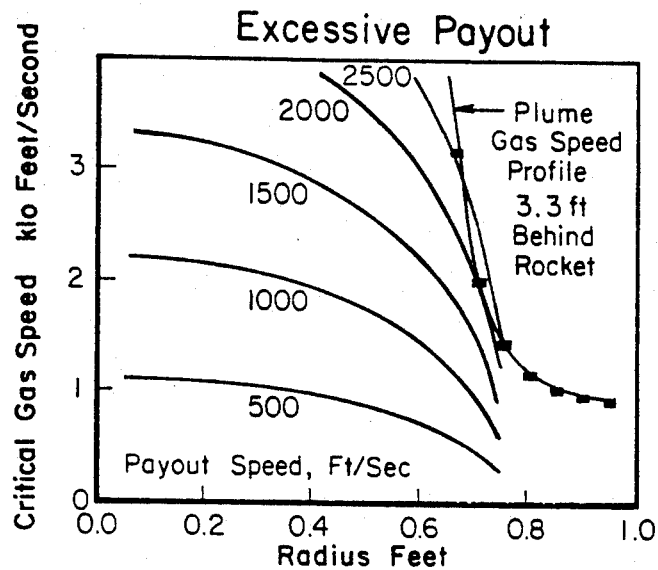
FIGS. 5-9 depict graphs of various aspects of rocket motor operation and fiber dispensing.
Figure 6:
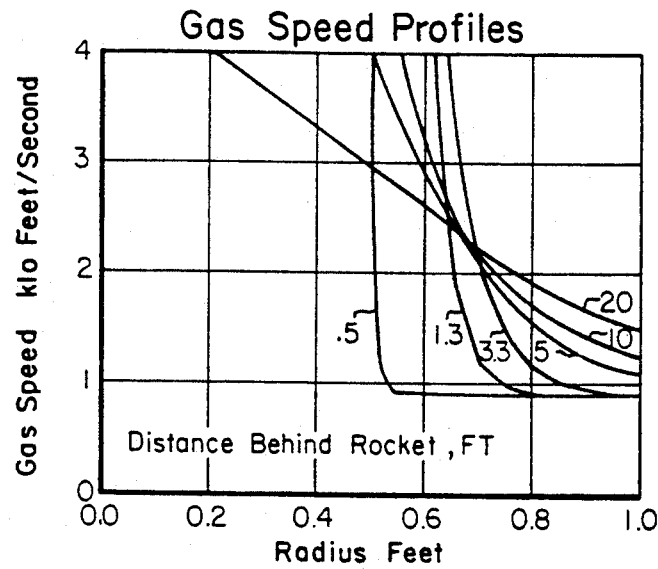

FIG. 6 is a graph of a certain present day rocket motor depicting a family of gas plume speed versus radius profiles at various distances behind the rocket motor nozzle. Comparison of FIG. 5 showing the critical gas speed curves with the plume gas speed profiles of FIG. 6 shows that filament payout speed must rise to approximately 2,000 feet per second for all rocket motor plume profiles to fall below the critical gas speed boundary.

It can be shown that cable tension produced during payout varies as the square of the fiber payout speed and, therefore, 2,000 feet per second is in excess of the payout speed which can probably be safely utilized with known cable materials. Also for other reasons, dispensing filament cable at a rate significantly in excess of the missile speed is undesirable.

Figure 7:
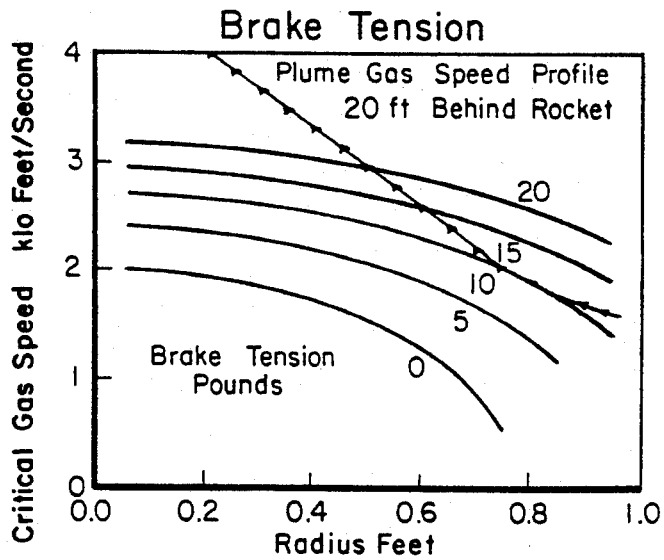
Figure 8:
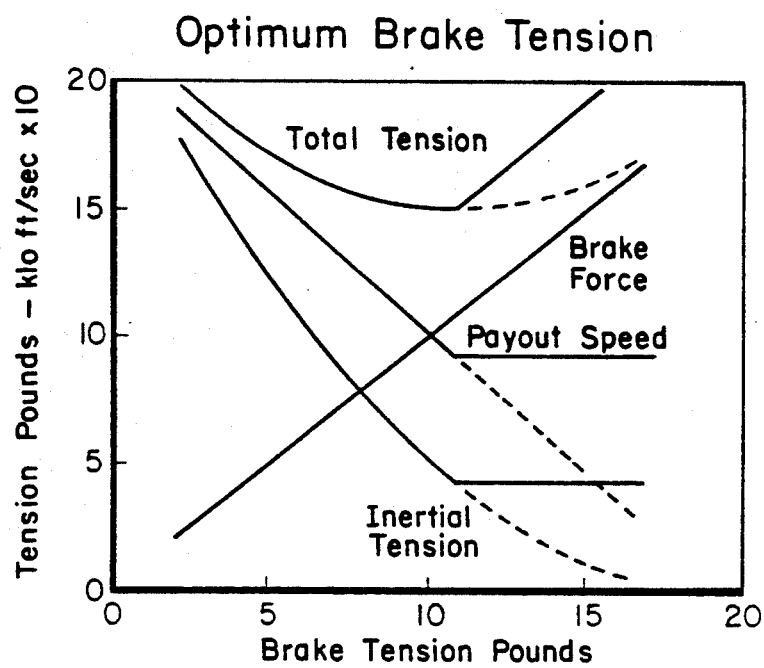

In addition to the various factors already discussed, it can be shown that increasing filament cable tension causes the helix to be stretched out along the path of propagation so that the helix angle becomes larger and, therefore, the critical gas velocity will be correspondingly increased. As will be more particularly described, in accordance with the present invention cable tension is added to a dispensed filament cable by use of a brake acting on the fiber at the time of dispensing. The curves shown in FIGS. 7 and 8 pertain to a cable consisting of a buffered optical fiber having a 10-mil diameter, jacketed by a 2.5-mil layer of E-glass reinforced epoxy resin with breaking strength calculated to be appropriately 20 pounds. FIG. 8 shows the variation in payout speed with braking force tension for payout and the total cable tension. In summation, the minimum total tension is found to occur when the payout speed equals the missile flight speed.

It is necessary that an initial length of the filament to be dispensed include a reinforcing armor in order to withstand the initial relatively high tension and, as well, to provide thermal protection since that part of the cable will pass through a part of the rocket motor plume. This reinforced fiber 42, which is also referred to here as "leader", consists of a length of the fiber cable 32 encased within a covering which provides both increased tensile strength as well as thermal protection for the enclosed fiber. To reduce the possibility of thermal damage, the leader 42 is dispensed into the rocket plume at a point radially spaced a substantial distance from the plume central axis at which point the temperature is relatively cooler. Also, after the fiber cable develops substantially full dispensing velocity, each fiber element is in the plume only a very short time which significantly reduces the heating effect on the fiber and there is no longer need for the fiber to be reinforced.

Figure 4:
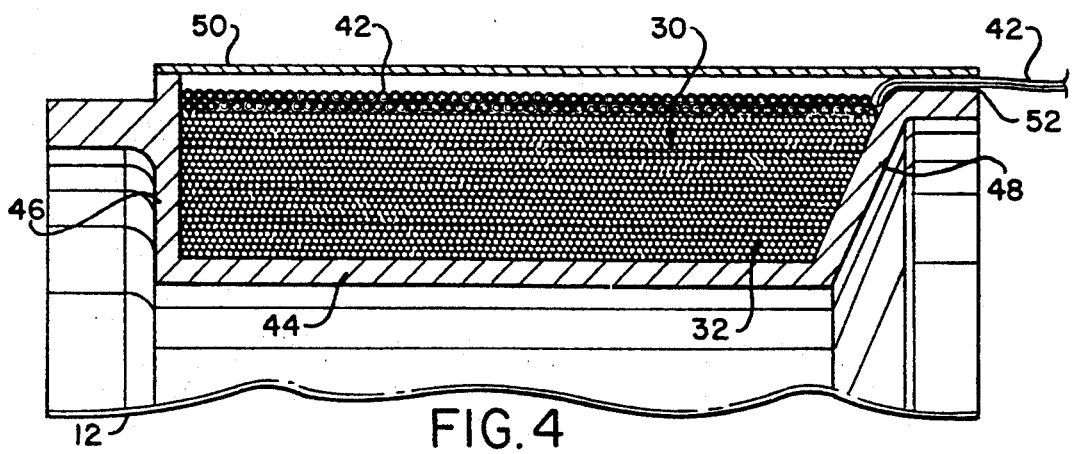
FIG. 4 is an enlarged side elevational, sectional view of the dispenser and pinch brake.

For the ensuing description of the fiber dispenser details, specific reference is made to FIG. 4. The fiber pack 30 is seen to be wound upon the peripheral surface of a generally cylindrical drum 44 having an integral back wall 46 and front wall 48 between which the pack is wound. A cylindrical sidewall 50 is secured to the back wall 46 covering the pack and is spaced from the upper edge of the front wall 48 forming a circular gap or space 52. The space 52 is slightly smaller than the leader cross-section so that as the leader is dispensed therethrough frictional contact will occur of a measured amount braking the dispensing speed to less than a predetermined maximum critical value.

Figure 9:
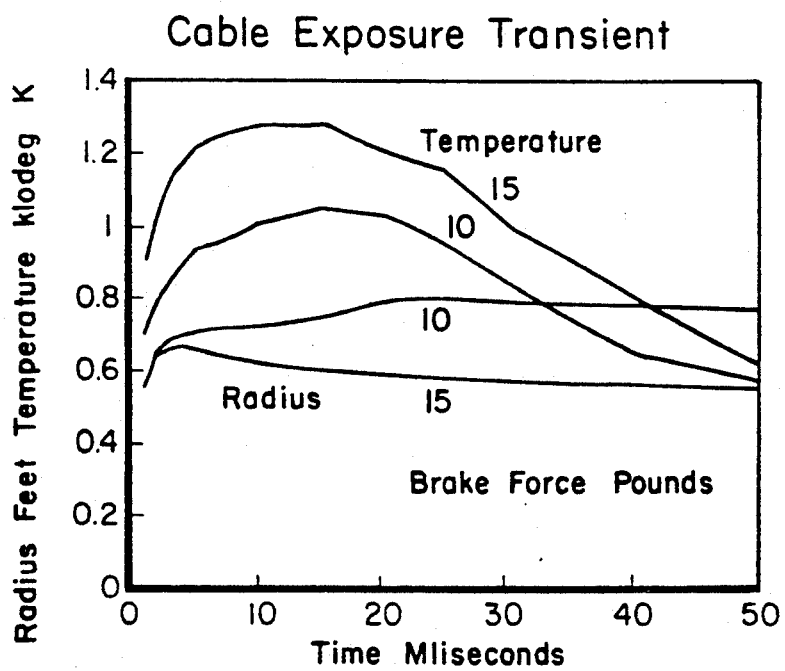

As can be derived from FIG. 9, as the braking force increases this results in a corresponding increase in leader (fiber) temperature. The reason for this simply is that an increase of the brake frictional engagement with the leader causes the helix diameter to become smaller and, therefore, the leader moves into hotter portions of the rocket plume.

As the leader 42 is dispensed it passes through the outer reaches of the plume 36 in view of its tendency to follow a helical dispensing path. On contact of the leader with the rocket motor plume, the rocket motor gases tend to pull on the leader until full dispensing velocity is achieved. The combined effect of the braking action and the action of the plume gases on the leader dispenses the leader within a desired payout speed which closely approximates the speed of the vehicle, and this is accomplished without the use of expensive and complex apparatus. In addition, it is not necessary to operate the rocket motor in an inefficient manner (i.e., oriented off-axis) in order to prevent or avoid having the leader and fiber pass through the rocket plume as is done in certain existing missiles. Still further, by dispensing in the manner described, it is not necessary to use adhesive in storing the filament pack on the drum and thereby avoids the difficult problem of peel-off bending of the fiber which has been found to deteriorate the optical signal and in many cases sever the fiber completely.

Although the foregoing has been a description of a specific embodiment of the invention, various modifications and changes thereto can be made by individuals skilled in the appertaining art without departing from the scope and spirit of the invention as defined by the following claims.

What is claimed is:

1. A method of dispensing an optical fiber from within a missile of the type having a rocket motor generating an exhaust plume from an aft end of the missile, comprising the following steps:

positioning a wound fiber pack within the aft end portion of the missile with the rocket motor encircled by the fiber pack, wherein said fiber pack includes an initial length of optical fiber within a protective jacket;

releasing optical fiber from the pack along a path intersecting a portion of the exhaust plume at a location radially spaced from a central axis of the plume, thereby significantly reducing the adverse affect of direct, prolonged contact between the exhaust plume and the optical fiber; and applying a continuous braking force only to the initial, protected length of optical fiber after the optical fiber has separated from the wound fiber pack.

2. A method as in claim 1, including the step of limiting the maximum speed at which fiber is released from the pack to a speed which closely approximates the missile's flight speed.

3. Apparatus for dispensing an optical fiber from within a missile of the type having a rocket motor generating an exhaust plume from an aft end of the missile, and comprising:

an optical fiber dispenser mounted within the aft end portion of the missile with the rocket motor encircled by the dispenser;

said dispenser including a cylindrical drum having a longitudinal axis aligned with a central axis of the missile and about which the optical fiber is wound into a filament pack having an initial portion of the optical fiber enclosed in a protective jacket, wherein the drum includes a generally cylindrical front wall having a peripheral edge extending generally parallel to the longitudinal axis of the drum;

said dispenser further including a cylindrical cover spaced from the fiber pack and overlapping the peripheral edge of the drum, thereby forming an outlet encircling the rocket motor through which optical fiber exits the dispenser and intersects a portion of the exhaust plume at a location radially spaced from a central axis of the exhaust plume, significantly reducing the adverse affect of direct, prolonged contact between the exhaust plume and the optical fiber; and braking means for providing a continuous braking force to only the initial, enclosed portion of the optical fiber as it exits through the outlet.

4. Apparatus as in claim 3, wherein said braking means comprises said dispenser outlet having a width slightly less than the diameter of the enclosed, initial portion of the optical fiber.

* * * * *